United States Patent [19]
Blank et al.

[11] Patent Number: 6,158,422
[45] Date of Patent: Dec. 12, 2000

[54] SUPERCHARGING ARRANGEMENT FOR THE CHARGE AIR OF AN INTERNAL COMBUSTION ENGINE

[76] Inventors: Otto Blank, Porschestrasse 9; Gerald Buha, Mösingerweg 6, both of A-4400 Steyr; Andreas Mayer, Fohrhölzlistrasse, 14b, CH-5443 Niederrohrdorf, Schweiz, all of Austria

[21] Appl. No.: 09/077,471
[22] PCT Filed: Nov. 28, 1996
[86] PCT No.: PCT/AT96/00236
    § 371 Date: May 29, 1998
    § 102(e) Date: May 29, 1998
[87] PCT Pub. No.: WO97/20134
    PCT Pub. Date: Jun. 5, 1997

[30] Foreign Application Priority Data

Nov. 30, 1995 [AT] Austria ................................. 1960/95

[51] Int. Cl.⁷ .......................................... F02B 33/00
[52] U.S. Cl. ................................. 123/559.2; 123/563
[58] Field of Search .................... 123/559.2, 563; 417/64

[56] References Cited

U.S. PATENT DOCUMENTS

| | | |
|---|---|---|
| 3,011,487 | 12/1961 | Berchtold . |
| 3,874,166 | 4/1975 | Kirchhofer et al. ................. 123/559.2 |
| 4,173,868 | 11/1979 | Wunsch . |
| 4,206,607 | 6/1980 | Heberle et al. . |
| 4,288,203 | 9/1981 | Fried et al. . |
| 4,309,972 | 1/1982 | Vallance et al. . |
| 4,702,218 | 10/1987 | Yoshiokee et al. ................. 123/559.2 |
| 4,744,213 | 5/1988 | El-Nashar . |
| 4,796,595 | 1/1989 | El-Nashar et al. . |
| 4,910,959 | 3/1990 | Dones ................................. 123/559.2 |

FOREIGN PATENT DOCUMENTS

| | | |
|---|---|---|
| 0028035 | 5/1981 | European Pat. Off. . |
| 0151407 | 8/1985 | European Pat. Off. . |
| 223214 | 10/1986 | Japan ..................................... 123/563 |
| 1522299 | 8/1978 | United Kingdom . |

OTHER PUBLICATIONS

Patent Abstracts of Japan, vol. 011, No. 318, Oct. 16, 1987, of JP 62 101850 (Mazda Motor Corp.), dated May 12, 1987.
Patent Abstracts of Japan, vol. 015, No. 168, Apr. 26, 1991, of JP 03 033432 (Mazda Motor Corp.), dated Feb. 13, 1991.
Patent Abstracts of Japan, vol. 013, No. 257, Jun. 14, 1989, of JP 01 060717 (M. Harada), dated Mar. 7, 1989.
Patent Abstracts of Japan, vol. 011, No. 247, Aug. 1987 of JP 62 055418 (Mazda Motor Corp.), dated Mar. 11, 1987.

*Primary Examiner*—Noah P. Kamen
*Attorney, Agent, or Firm*—Dykema Gossett PLLC

[57] ABSTRACT

The invention concerns a supercharging arrangement (1) for the charge air an internal combustion engine (2), in particular a piston engine (3), with a multi-cycle pressure wave machine (13) connected for flow to a feed line for the charge air and an exhaust line for the exhaust gases. The arrangement further comprises a cell rotor (15) which is rotatably mounted in a bearing arrangement in a housing, in particular has a plurality of grooves and is connected to a rotary drive and a control device (19).

16 Claims, 8 Drawing Sheets

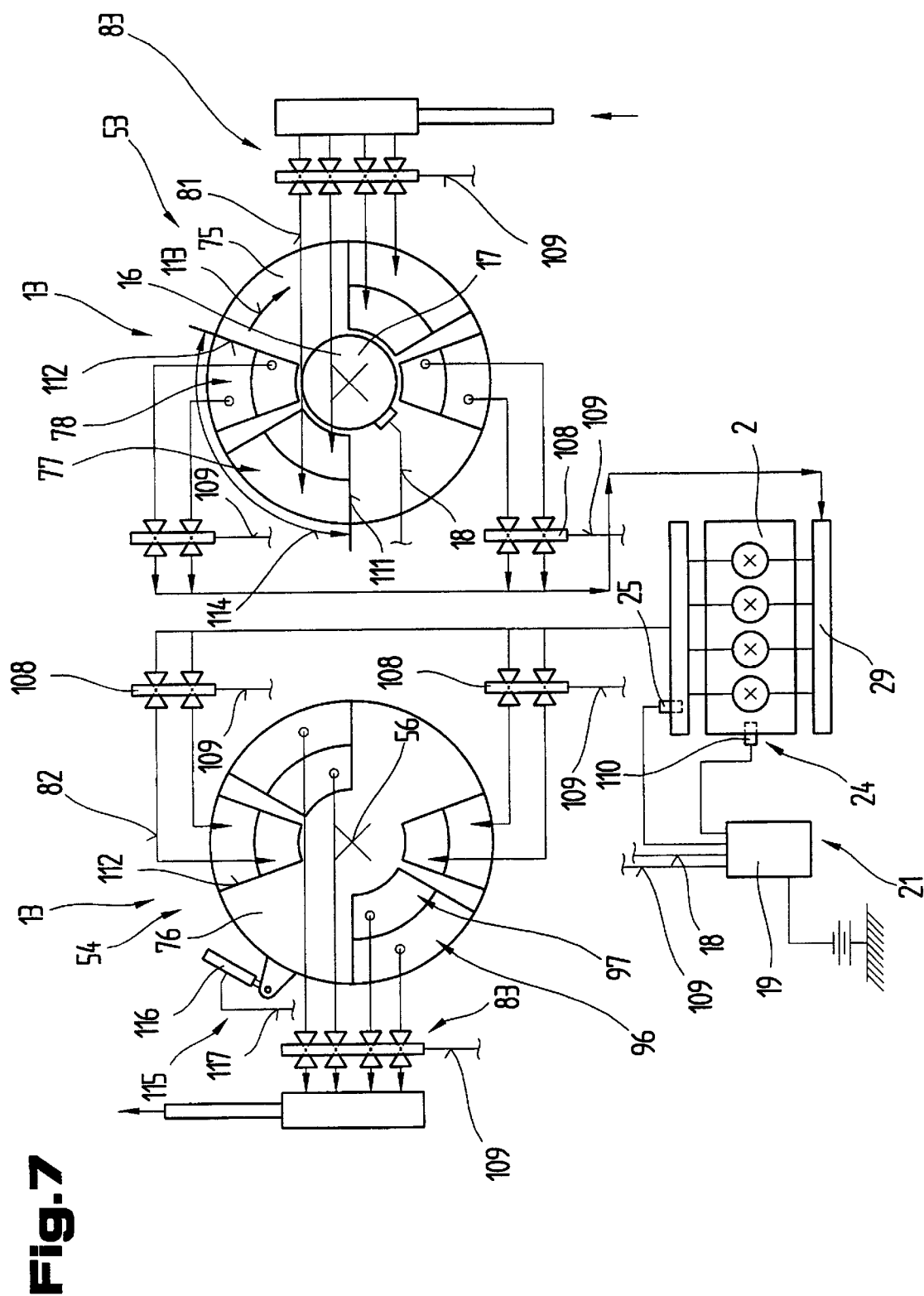

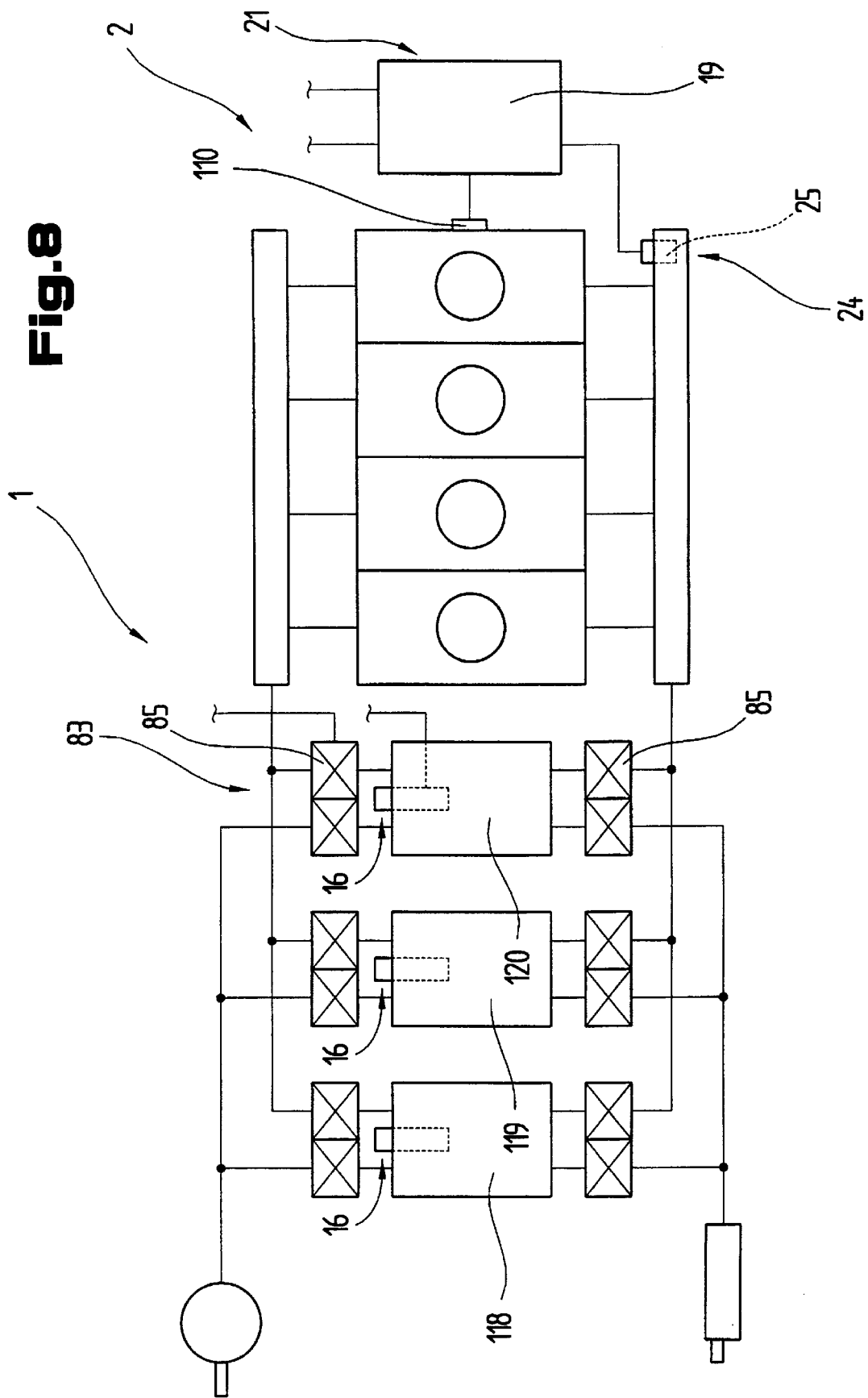

SUPERCHARGING ARRANGEMENT FOR THE CHARGE AIR OF AN INTERNAL COMBUSTION ENGINE

BACKGROUND OF THE INVENTION

1. Field of the Invention

The invention relates to a supercharging arrangement for the charge air of an internal combustion engine.

2. The Prior Art

From JP 01 060 717 A a supercharging arrangement for the charge air of an internal combustion engine, in particular of a piston engine, is known which is arranged as a pressure wave machine which is flow-connected with an air-inlet line for the charge air and an exhaust gas line for the combustion gases of the piston engine. The pressure wave machine is provided with a housing which is formed by a charge air face housing, an exhaust gas face housing and a housing part which mutually distances the same. The housing, in particular the charge air face housing and exhaust gas face housing, is provided with flow-in and flow-off ducts. A cell rotor is disposed in the housing which is rotatably held in a bearing arrangement and is provided with several paths of flow which are arranged concentrically with respect to one another and is connected with a rotary drive. Switching members are arranged in the exhaust gas face housing in flow-in ducts for the combustion gases to the paths of flow. The disadvantage in this respect is that a pressure-charged path of flow is flow-connected on the charge air side with flow-off ducts by way of flow-off ducts assigned to the same and the air-inlet line, which flow-off ducts are assigned to a path of flow which is not charged with pressure. In this way the charge air which is compressed via the pressure waves of the combustion gases cannot only penetrate the air-inlet line for the charge air to the piston engine on reaching the charge air face housing, but can also penetrate the other paths of flow which are not charged with pressure waves for example. This causes an undesirable pressure loss and thus a reduction in the efficiency of the pressure wave machine and consequently a more unfavourable controllability of the pressure wave process.

From JP 62 101 850 A a supercharging arrangement for the charge air of a combustion engine is known which is arranged in a flow-connected manner between an air-inlet line for the charge air and an exhaust gas line for the combustion gases. It is arranged as a pressure wave machine and is provided with a cell rotor. The air-inlet line for the charge air is provided on the high-pressure side with a switching member which can be used to change the air inlet stream to the internal combustion engine. The disadvantage in this embodiment is that also in the case of using a cell rotor with several paths of flow which are arranged concentrically with respect to one another it is not possible to prevent that compressed charge air is conducted from a path of flow which is in operation, i.e. it is charged with pressure waves, to another path of flow which is not in operation. As already described above, this leads to an undesirable pressure loss.

GB 2 065 232 A and U.S. Pat. No. 3,011,487 A describe an angular offset of inlet and outlet openings in exhaust gas face housings and charge air face housings. This angular offset can be adjusted to the speed of the internal combustion engine.

A device for supercharging an internal combustion engine is known from DE 26 33 568 C2 in which an exhaust gas turbocharger is connected with the gas-dynamic pressure wave machine which is connected in series on the exhaust gas side and air side and causes a supply of the internal combustion engine with fresh air in two stages. The exhaust gas turbocharger is used for the high-pressure stage and the pressure wave machine for the low-pressure stage. This known device further also provides the intermediate heating of the exhaust gas prior to its supply to the pressure wave machine. This device requires a high amount of technical complexity, as a result of which its application in the low and medium output spectrum of internal combustion engines is not favourable.

From DE 28 44 287 C2 a parallel-flow gas-dynamic pressure wave machine is known which is provided with a cell rotor which is rotatably held in the housing by way of a driving axle and the drive of the cell rotor is performed by way of a belt drive via the crankshaft of the internal combustion engine. The disadvantage in such an embodiment is that the pressure wave machine is operated in direct dependence on the rotational speed of the internal combustion engine, as a result of which the efficiency of the pressure wave machine, particularly in the lower speed range of the internal combustion engine, is low and a control of the efficiency for the achievement of a high efficiency even in the lower speed ranges is not possible as a result of the dependence of the rotational speed on the internal combustion engine.

From EP 0 235 609 A1 a free-running pressure wave charger with a rotor housing and a cell rotor within the rotor housing is described which is provided with cell walls which are axially parallel or disposed helically or inclined to the rotor axis and where air inlet and exhaust air ducts are arranged in the two face sides of the rotor housing. The drive of the cell rotor is performed by charging the cell walls with high-pressure exhaust gases which open into the rotor housing at a respective charging angle by way of gas ducts and the cell rotor is made to rotate by the entry of the exhaust gas. This requires additional ducts in the face side walls which cause an impairment in the positioning and arrangement of the charge air and exhaust gas ducts. Accordingly, the optimal arrangement of the charge air and exhaust gas ducts for a high efficiency of the pressure wave charger is not possible.

From EP 0 143 956 A1 a pressure wave machine with a cell rotor in cast arrangement is known which after the production is subjected to an inner coating with a catalytic material for the reduction of the pollutants contained in the exhaust gases. As a result of the strong turbulence in the cell rotor caused by the dynamic pressure process, an intimate contact arises between the catalyst and the gas and there is a favorable oxidation effect in connection with an oxygen enrichment by contact with the spray air and thus a detoxification of the exhaust gas. The disadvantages aspect is the complex coating process which requires and additional production stage for the cell rotor and the thus occuring thermal stresses for the cell rotor during the coating, thus requiring a massive arrangement of the cell rotor.

It is the object of the present invention to provide a supercharging arrangement for an internal combustion engine with which a high efficiency and thus in total a reduction of energy is achieved over the highest possible speed range of the internal combustion engine.

SUMMARY OF THE INVENTION

This object of the invention is achieved by the features as disclose in the characterizing part of claim 1. The surprising advantage is that as a result of the arrangement of the pressure wave machine with several compressor registers it is possible, irrespective of the rotational speed of the pressure wave machine, to adjust the supply volume of compressed charge air to the output-specific requirements of the internal combustion engine by switching registers on and off and that also an assignment of compressed charge air to individually or group-wise supplied cylinders of the internal combustion engine can be realized.

An arrangement is also advantageous wherein an operation with adjustment speed is possible in conjunction with an independent speed control of the pressure wave machine in which a pressure wave resonance operation is given over the entire demand range which is dependent on the rotational speed of the internal combustion engine, and thus a high pressure level and high degree of compression are achieved in the internal combustion engine, which leads to a high utilization of energy of the supplied fuel and thus to an increase in the total efficiency of the unit.

An embodiment is also advantageous wherein in this way an other control possibility and adaptation of the output of the pressure wave machine is achieved to the speed-dependent power requirement of the internal combustion engine.

An arrangement is also possible wherein a sufficiently fine-staged adjustment of the air availability of the pressure wave machine to the demand of the internal combustion engine is achieved.

An embodiment is also possible wherein approx. the same cross section for the paths of flow can be achieved at predetermined volume shares for the compressor registers.

As a result of an advantageous further development, an adaptation to the no-load, partial-load and full-load range of the internal combustion engine is achieved with respect to the conveying capacity of the individual compressor registers, and it is further advantageously possible to operate a compression register continuously for example, i.e. also in the lower speed range of the internal combustion engine.

Pursuant to a further development, face-sided sealing surfaces are achieved on the cell rotor which allow a subdivision and division of the gas flows among the compressor registers.

An advantageous further development is possible wherein it is possible to use standard, simply designed sealing elements which are suitable for application at high speeds and, optionally, high temperatures.

Pursuant to advantageous further developments, a more compact size is achieved at a comparable output spectrum and thus weight is saved and the arrangement in the internal combustion engine is improved.

Other embodiments are also advantageous, as they can be used to activate and deactivate the individual compressor registers of the pressure wave machine according to the respective power requirement and predetermined control points, and thus the operation of the pressure wave machine in the optimal output spectrum occurs adjusted to the internal combustion engine. A special adaptation to the output spectrum is thus also possible for the start phase of the internal combustion engine, as also by the possibility of providing inner multiple stages which is enabled by the selective triggering of the individual compressor registers. The advantageous aspect is also that a compression register for example can be included from a switching-technological viewpoint as a so-called dynamic pressure brake in the exhaust gas stream of the internal combustion engine, with this occurring by a separate register or by respective conduction of lines and the respective switching precautions such as reversal switching by one of the existing registers.

An embodiment is also of advantage wherein as a result of which modular components are achieved which can be produced with high quality from a production viewpoint and thus enable a simplification in the production of the face housing of the pressure wave machine.

Pursuant to a preferable embodiment, a controllable admixture of a partial exhaust gas stream for the charge air is achieved with which the fresh air supplied to the internal combustion engine is mixed with a share of combustion residues, thus reducing the pollutant emission of the combustion gases and achieving a reduction in the wear and tear of the internal combustion engine.

An embodiment is also advantageous, because with the same a heat-up in the charge air zone of the cell rotor or the pressure wave machine which is caused by the temperature of the exhaust gases is prevented.

Preferable embodiments are also possible, because in this way a selective operation or one that is dependent on predetermined parameters can be achieved.

Pursuant to an advantageous embodiment an operation of the pressure wave machine with a resonance speed is achieved, as a result of which these operating conditions ensure high pressure stages and the internal re-circulation in the cell rotor, independent of the pressure conditions between exhaust back pressure and intake low pressure, is low and a noise reduction is achieved by a displacement of the frequency of the sound waves produced by the pressure waves into the frequency range which is no longer audible for the human ear. In this way, so-called gas pockets are avoided in the face housings and the arrangement of up to three cycles is enabled.

An embodiment is also advantageous, because in this way the pressure wave machine can be arranged independent in its position from the arrangement of the internal combustion engine and thus an optimized arrangement of lines is achieved for the air inlet line and exhaust gas line.

An embodiment is also advantageous, because in this way mechanical drive elements which are subject to high wear and tear by alternating stresses can be omitted.

An arrangement is also advantageous because in this way a separate drive motor for the pressure wave machine is avoided and thus a reduced susceptibility for faults of the charging system is achieved.

An embodiment is also possible, as a result of which an operation is achieved which is independent of power supply and is advantageous in units which owing to their field of application comprise additional hydraulic devices.

Pursuant to an advantageous further development, a higher utilization ratio is achieved from devices already present in a motor vehicle and tested in series production.

A further advantageous embodiment as a result of which the hydrostatic drive allows a continuous controllability of the rotational speed of the pressure wave machine which allows the same to be operated in the resonance range with the oscillations in the gas stream which are predetermined depending on output and rotational speed.

A further advantageous embodiment as a result of which a mechanical drive apparatus is achieved and the drive is performed by way of the internal combustion engine. Therefore, an additional drive motor is avoided and rotational speed control for the pressure wave machine is given.

An embodiment is also possible, as a result of which a determination of parameters as control values for the rotational speed control of the pressure wave machine is achieved and thus its operation with optimal output is brought about.

An embodiment is also advantageous, because in this way a variable degree in the freedom of arrangement is achieved which thus allows a high degree in the freedom of arrangement for the output adjustment of the cell rotor.

Pursuant to an advantageous further development, a cell rotor with a low dead weights is achieved which is provided with short response times and therefore reacts without any substantial delays in changes to the demand for power and requires a low driving power and leads to a reduction in the size of the pressure wave machine.

An embodiment is possible in this respect, because in this way a cleaning of the exhaust gas performed in a catalytical manner is achieved, since there is an intensive contact of the exhaust gases with the cell walls coated with catalytic material occurs in the cells of the cell rotor by turbulences in the flow and the cleaning process is further improved by the contact of the exhaust gas with the charge air supplied as fresh air.

A further advantageous embodiment as a result of which the effect of the pressure wave machine is already given in the starting phase of the internal combustion engine by supplying an external heat potential to the exhaust gases and thus occurs already in this phase of the combustion process by avoiding a high discharge of pollutants.

An embodiment is also possible, as a result of which a heating source is given as a preheating process is independent of the operation of the internal combustion engine and which benefits the starting phase of the internal combustion engine.

An embodiment is also possible, because standard devices known as auxiliary heating units can be used.

As a result of a further embodiment, a two-stage compression is achieved which leads to an increase in the efficiency of the unit, particularly in the higher speed range.

An embodiment is also advantageous, as a result of which it is possible to connect or disconnect the second compressor stage according to the actual demand for power.

An embodiment is also advantageous, as a result of which a return cooling of the charge air heated in the pressure wave machine by contact with the exhaust gas is achieved and thus a reduction of the volume and, accordingly, a higher degree of filling of the internal combustion engine is achieved.

Finally, an embodiment is possible, as a result of which excessive pre-compressed charge air which is present by overcapacity of the pressure wave machine is available as partial stream for the pressure filling of the pressure wave machine and thus for the improvement of the efficiency of the pressure wave machine and can be supplied to the same as needed.

For the purpose of better understanding the invention the same is explained below in closer detail by reference to the embodiments shown in the drawings.

BRIEF DESCRIPTION OF THE DRAWINGS

FIG. 7 shows a schematic representation of the supercharging arrangement in accordance with the invention with the pressure wave machine;

FIG. 8 shows a further embodiment of the supercharging arrangement in accordance with the invention in a simplified schematic representation.

DETAILED DESCRIPTION OF THE PREFERRED EMBODIMENT

Figure 1:
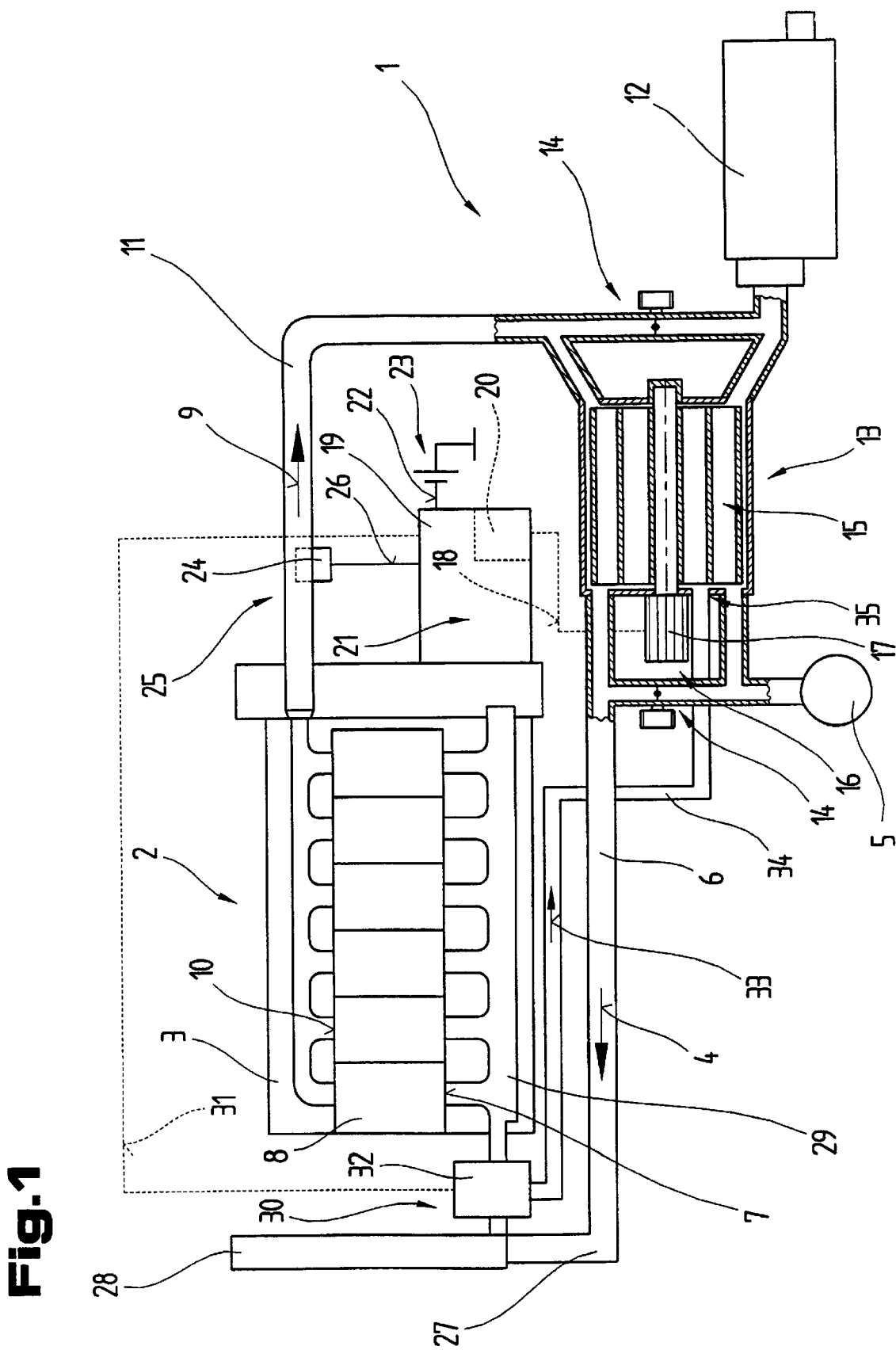
FIG. 1 shows an internal combustion engine with the supercharging arrangement in accordance with the invention in a schematic representation.

FIG. 1 shows a supercharging arrangement 1 for an internal combustion engine 2 such as a piston engine 3. The supply of the internal combustion engine 2 with combustion air (pursuant to arrow 4) occurs from the ambient air by way of an air filter 5 and conduits of pipes 6 which connect the air filter 5 with inlets 7 of cylinders 8. The discharge of exhaust gases (pursuant to arrow 9) occurs through outlets 10 of cylinders 8 and exhaust gas lines 11 and, finally, through a silencer 12 through which they are emitted to the ambient air.

A pressure wave machine 13 is arranged between the conduit 6 for the combustion air (pursuant to arrow 4) and the exhaust gas line 11 for the exhaust gas (pursuant to arrow 9), which machine forms a parallel flow course in the manner of a bypass to the conduit 6 for the combustion air and exhaust gas line 11 for the exhaust gas. Venturi butterfly valves 14 in the conduit 6 and the exhaust gas line 11 allow the activation and deactivation of the flow course of the combustion air and the exhaust gas via a cell rotor 15 of the pressure wave machine 13.

Conduit 6 for the combustion air may be provided in the zone of the pressure wave machine 13 with snifting valves which are flow-connected with the ambient air in front of and/or behind the Venturi butterfly valve in the flow direction of the combustion air in order to enable the sucking in of fresh air in the event of any underpressure occurring as a result of the operation.

The pressure wave machine 13 is further provided with a drive apparatus 16 for the cell rotor 15 which in the shown embodiment is formed by an electromotor 17, as a result of which a rotational speed is achieved which is independent of and detached from the internal combustion engine 2. The electromotor 17 is connected with a control device 19 by way of a line 18, which control device is provided with a speed controlling device 20 for the electromotor 17 and comprises an evaluating and control unit 21 and is connected by way of a feed line 22 with a power source 23 such as a battery, generator, etc. Moreover, measurement transducers 24 such as a thermal sensor 25 which is arranged in the exhaust gas line 11 are provided for the detection of various parameters of the internal combustion engine 2. The transducers 24 are connected through control lines 26 with the evaluation and control unit 21.

The electromotor 17 is also supplied via the feed line 22 and the line 18 with the power from the power source 23 which is required for the operation.

As a result of the speed of the pressure wave machine 13 which can be controlled independent of the respective speed of the internal combustion engine 2 by means of the speed controlling device 20 and the electromotor 17, the boost pressure required for a high and even output range of the internal combustion engine 2 can be achieved for the charging of the internal combustion engine 2 with the combustion air which are derived from parameters determined through the measurement transducer 24.

As a result of the drive of the pressure wave machine 13 which is independent of the internal combustion engine 2 it is possible to improve both the operating conditions already in the lower speed range as well as the optimal effect of the pressure wave machine 13 during the new start of the internal combustion engine 2, i.e. also at a low temperature range of the exhaust gases.

The fresh air supplied via the air filter 5 and the conduit 6 during the closed position of the Venturi butterfly valve 14 of the pressure wave machine 13 is compressed in the same by the pressure effect of the exhaust gases and supplied through a charge air line 27 and, optionally, an air cooler 28 and an air collector 29 which is provided upstream of the inlets 7 of the cylinders 8. This air collector 29 thus contains a compressed charge air potential for the filling of cylinder 8, as a result of which a higher compression and improved turbulence of the injected fuel is achieved.

A charge air control apparatus 30 is arranged in the flow direction of the combustion air between the air cooler 28 and the air collector 29, which control apparatus is connected via a control line 31 with the control device 19. The charge air control apparatus 30 is formed by a switchable control valve 32 for example which branches off a partial stream (pursuant to arrow 33) from the combustion air supplied to the air collector 29 and supplies the same by way of a return line 34 on the low pressure side to the pressure wave machine 13, in particular a register cycle 35. As the dimensioning of the pressure wave machine 13 s designed for a higher conveying volume of combustion air than is required by the internal combustion engine 2, there can be, if required, a precharging of the pressure wave machine 13 by this branched-off and return-cooled pre-compressed partial stream which leads to an increase of the pressure potential.

Figure 2:
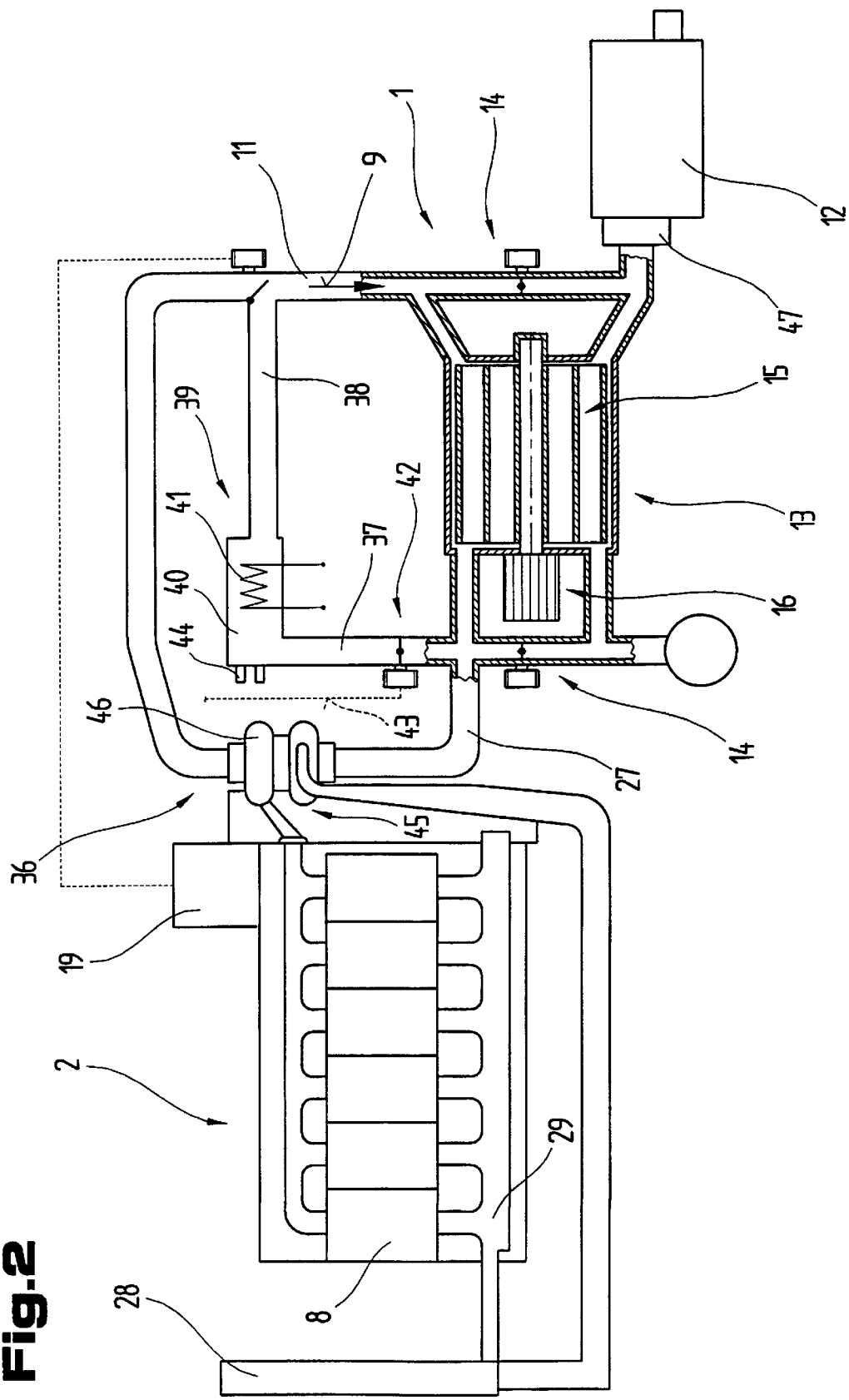
FIG. 2 shows an other embodiment of the supercharging arrangement in accordance with the invention for an internal combustion engine in a simplified schematic representation.

FIG. 2 shows a further embodiment of the supercharging arrangement of an internal combustion engine 2. The same reference numerals are used for the same elements in the description below as were already used in the preceding description. In this embodiment a two-stage charging of the internal combustion engine 2 is achieved in such a way that a charging unit 36, which is known as "turbocharger", is arranged in series with the pressure wave machine 13.

A heating device 39 is connected in parallel in this embodiment with the pressure wave machine 13 via conduits 37, 38. This heating device 39 is provided, for example, with a heat exchanger 40 and a heating source 41 such as an electric damper register, fuel burner, etc., with the air flowing through the heat exchanger 40 being heated during the operation of the heating device 39. The supply of the air to the heating device 39 occurs through the conduit 37 which is in flow connection with the charge air line 27 and the discharge of the air heated in t he heating device 39 occurs into the exhaust gas line 11, namely in the direction of flow of the exhaust gas (pursuant to arrow 9) before its supply to the cell rotor 15 of the pressure wave machine 13. The activation and deactivation of the course of flow for the heating device 39 is possible by way of Venturi butterfly valves 42 which are in line connection with the control device 19 via control lines 43.

As is shown schematically, the heating device 39 can be in line connection with the internal combustion engine 2 by way of a conduit system 44 in order to be able to perform a pre-heating of the same for the improvement of the cold-start properties. It is understood that this heating device 39, arranged as an auxiliary heater, can be used for different heating purposes within the scope of operation, e.g. a motor vehicle with the internal combustion engine 2. It is possible by means of the heating device 39 in conjunction with the cell rotor 15 which can be operated independently by way of the drive apparatus 16 to achieve a perfect function for charging the internal combustion engine 2 already for the starting process in which the exhaust gases do not yet have the temperature level required for the function of the pressure wave machine 13. As a result of the supply of heated air to the exhaust gases and the independent adjustment of the rotational speed of the cell rotor 15, the required pressure level for the charge air can be achieved. In this way impairments to the environment by increased exhaust of emissions, as occur particularly during cold starting, are effectively prevented.

As is shown further in FIG. 2, the charge air precompressed in the pressure wave machine 13 is supplied to a compressor 45 of the charger unit 36 via a charge air line 27 and, after passing through this second compression stage through the air cooler 28, it is supplied to the air collector 29 of the internal combustion engine 2 or its cylinders B. The power to be generated for the operation of the compressor 45 is produced by an exhaust gas turbine 46 which is flowed through by exhaust gas before the same is supplied via exhaust gas line 11 to the pressure wave machine 13 or, depending on the control state of the Venturi butterfly valve 14, to the pressure wave machine 13 or the silencer 12 and is discharged through the same or, optionally, after flowing through a catalyst 47 to the ambient air.

This two-stage compression in the pressure wave machine 13 and subsequently the charging unit 36 leads to an optimal charge pressure for the charging of the internal combustion engine 2 in the entire speed range of the internal combustion engine 2 and thus a precise adjustment of the output range to all operating conditions. This optimization of the output ensures an economical operation of the internal combustion engine 2 which also leads to a reduction of pollution to the environment as occurs by the combustion of fossil fuels.

Figure 3:
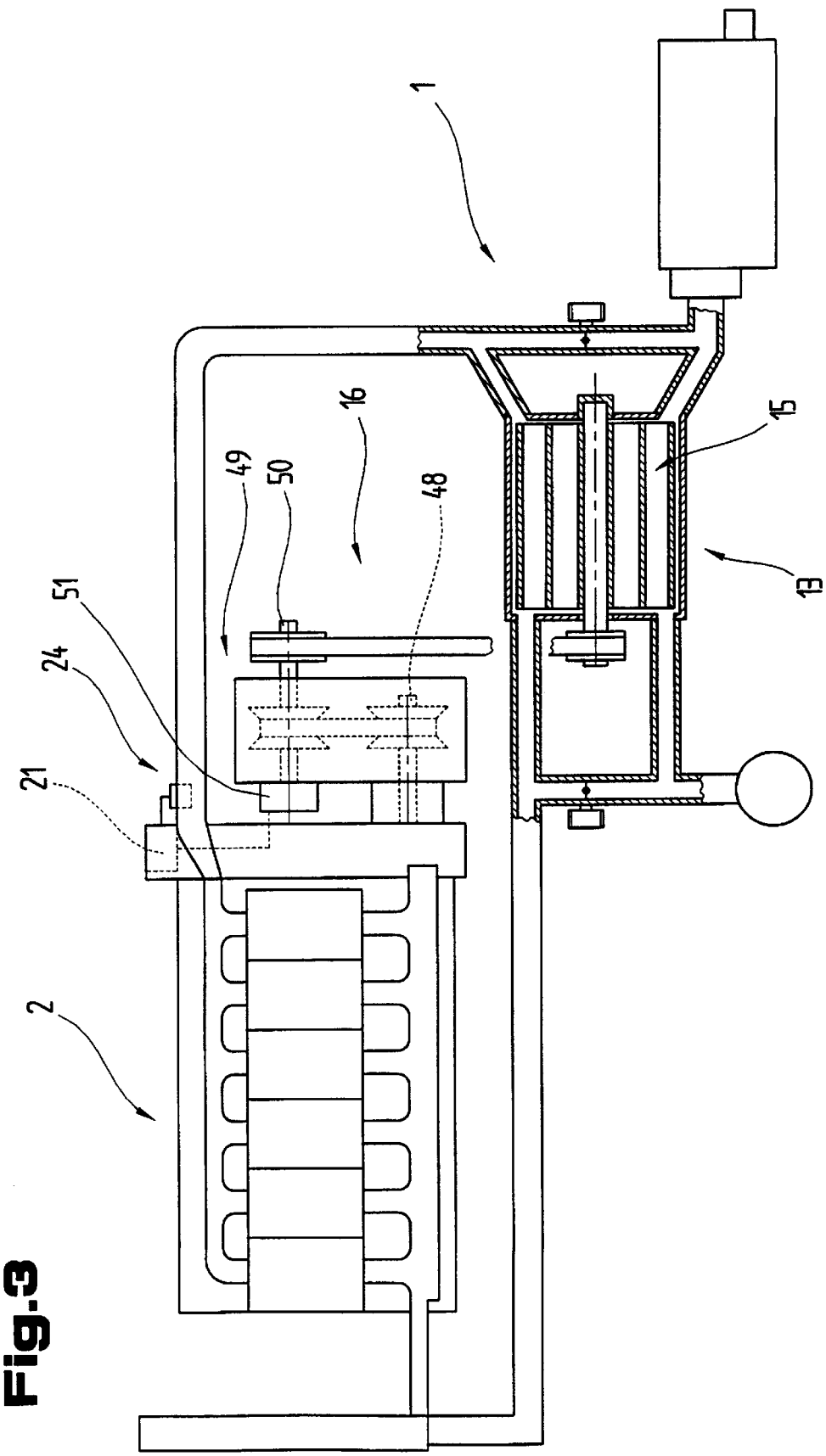
FIG. 3 shows a further embodiment of the supercharging arrangement in accordance with the invention in a simplified schematic representation.

FIG. 3 shows another embodiment of the supercharging arrangement of an internal combustion engine 2. The same reference numerals are used for the same elements in the description below as were already used in the preceding description. In this embodiment the drive of the pressure wave machine 13 occurs through a driven shaft 48 of the internal combustion engine 2, e.g. a power take-off, and through a speed-controllable intermediate gear 49 with which the pressure wave machine 13 is in drive connection. Such a drive connection can be provided by means of a belt drive for example, as is also shown. It is understood that also a direct coupling of the pressure wave machine 13 with an output shaft 50 of the intermediate gear 49 would be possible.

The control of the speed of the pressure wave machine 13 or of the cell rotor 15 can thus occur independent of the respective speed of the internal combustion engine 2 over wide ranges. Such a control can again occur dependent on parameters of the internal combustion engine 2 in the evaluation and control unit 21 which are determined through the measuring transducer 24, which control unit is line-connected with the actuating drive 51 of the intermediate gear 49.

Instead of the drive apparatus 16 with the intermediate gear 49 there is also an other possibility for driving the pressure wave machine 13 by means of a pressure medium such as a hydromotor which is charged with hydraulic oil and which is drive-connected with the pressure wave machine 13. Such a drive solution also allows controlling the speed of the pressure wave machine 13 independent of the speed of the internal combustion engine 2 according to operational requirements and constitutes an economical solution in units which are provided with a hydraulic system for the operation of different working tools.

Figure 4:
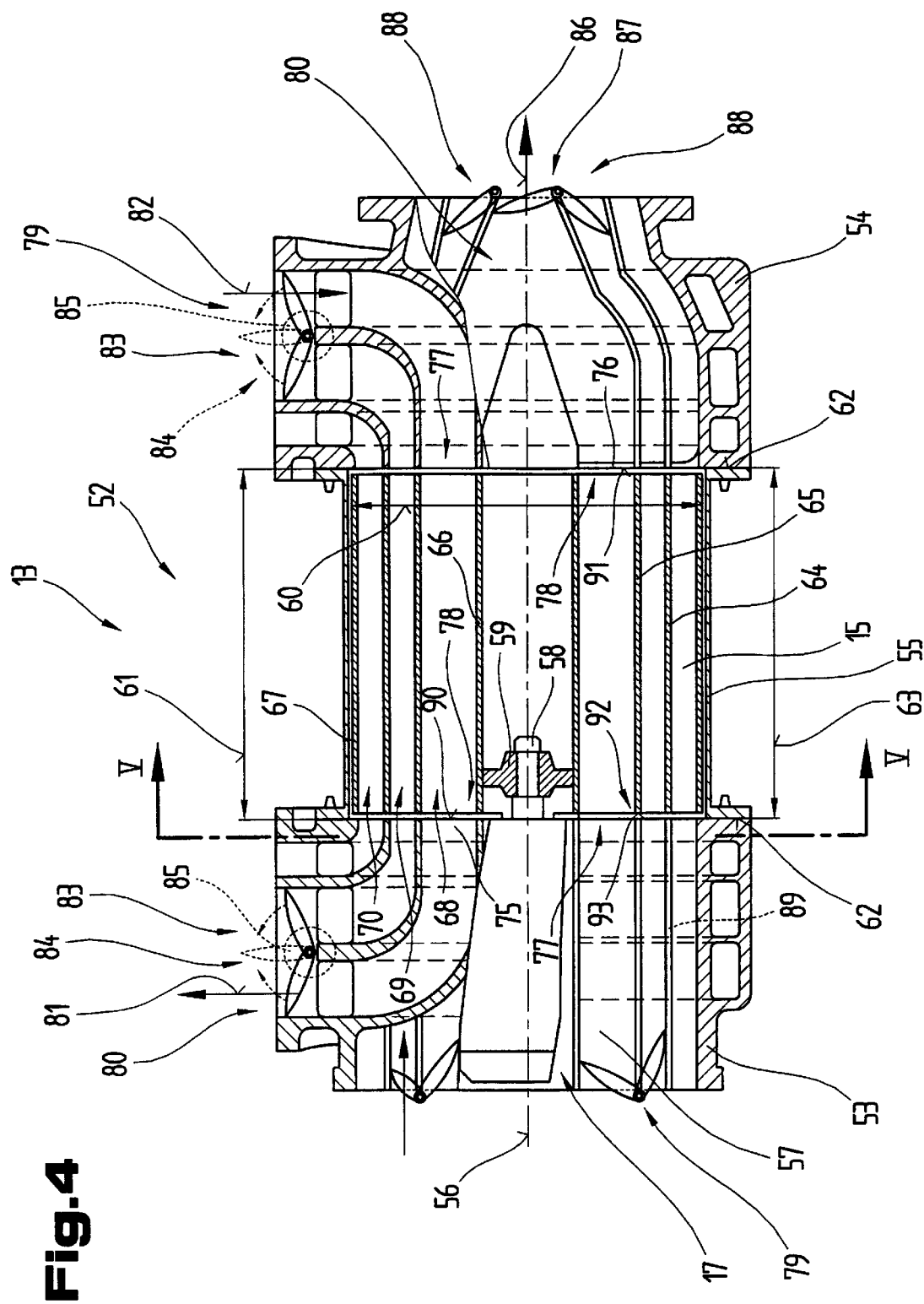
FIG. 4 shows the pressure wave machine in accordance with the invention in a simplified sectional representation.
Figure 5:
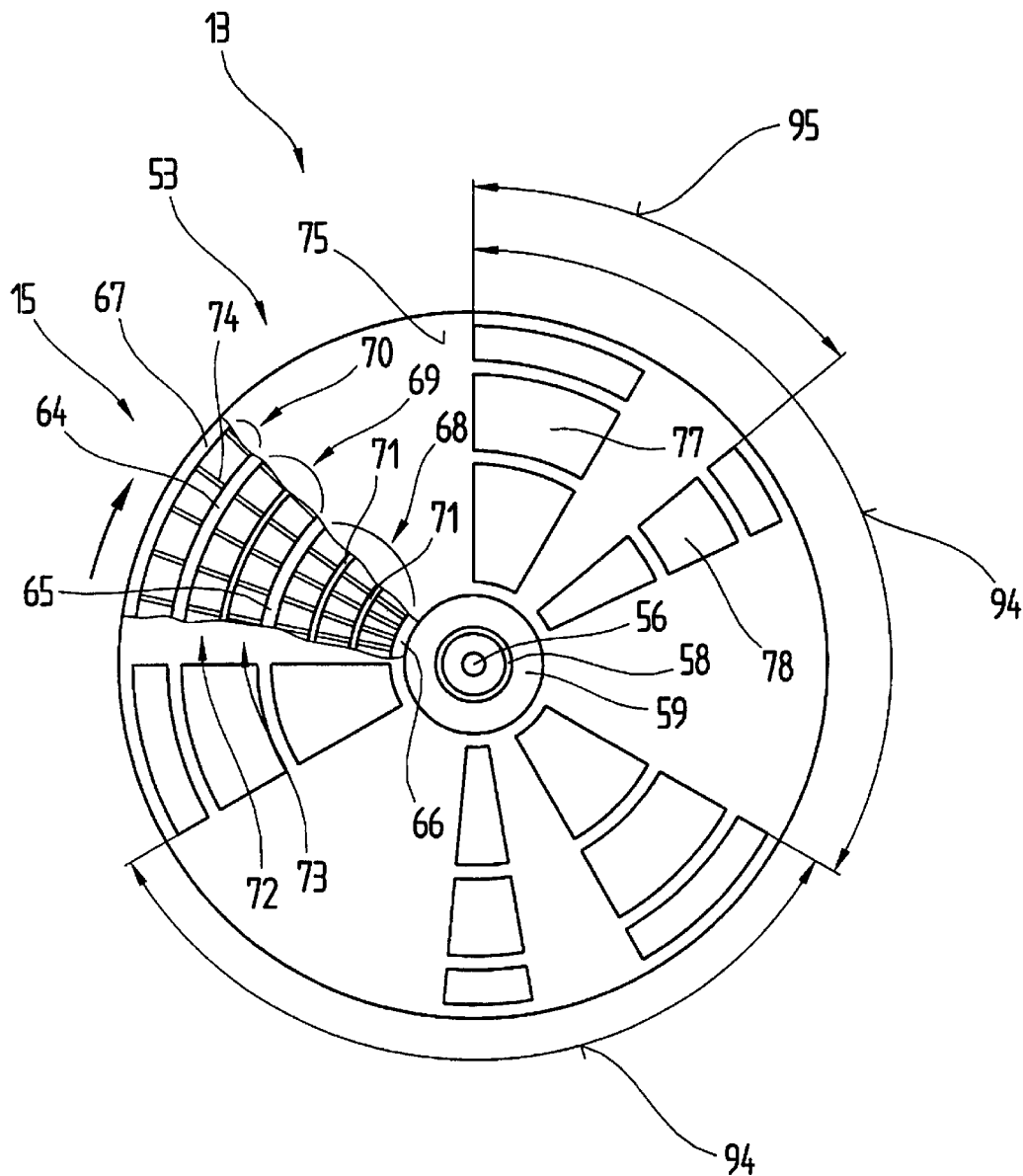
FIG. 5 shows the pressure wave machine in a sectional view a long lines V—V in FIG. 4.

FIGS. 4 and 5 show a further embodiment of the pressure wave machine 13, with the same reference numerals being maintained for the same elements as described in the preceding figures.

A housing 52 of the pressure wave machine 13 is substantially arranged in three parts and is provided with a charge air face housing 53, an exhaust gase face housing 54 and a housing part 55 which mutually distances these parts. The housing part 55 is arranged at opposite face ends in a flange-like manner for the attachment of the charge air face housing 53 and exhaust gas face housing 54. The housing 52 is preferably formed by injection moulded parts, diecast parts, etc.

A motor housing 57 is arranged in the charge air face housing 53 concentrically to the longitudinal central axes 56 of the pressure wave machine 13, which housing forms the electromotor 17. A motor shaft 58 projects into the housing part 55 and is torsionally rigidly coupled with a hub 59 of the cell rotor 15 and is rotationally movably positioned via the motor shaft 58 with respect to the housing 52 and is rotationally movably held via the electromotor 17. Such an embodiment is also designated as flying arrangement and yields advantages in the respect that changes in length of the cell rotor 15 as occur by changing thermal stresses do not cause any twisting, as would otherwise occur in a two-sided bearing.

An inner diameter 60 of the housing part 55 is approx. equivalent to a distance 61 between mutually oppositely arranged face sides 62 of the housing part 55, which thus corresponds to a length 63 of the housing part 55. The cell rotor 15 is subdivided into three compressor registers 68, 69, 70 for example by tube-like register walls 64, 65 which are arranged concentrically to the longitudinal central axis 56 and between an inner tube 66 comprising a hub 59 and a jacket tube 67 which encompasses the cell rotor 15 on the outer circumference. Said compressor registers 68, 69, 70 can further be subdivided into paths of flow 72, 73, as is shown with the example of the compressor register 68 which immediately encompasses the inner tube 66, by a tube-like parallel-flow wall 71 which extends concentrically to the longitudinal central axis 56. The cell rotor 15 is provided with bridge-like cell walls 74 extending in the radial direction to the longitudinal central axis 56. Said bridge-like cell walls are used to position the register walls 64, 65 and parallel-flow wall 71 between the inner tube 66 and the jacket tube 67 and are rigidly connected with the same.

The face surfaces 62 can optionally be arranged as plane surfaces or partly as overlapping sealing surfaces in order to achieve a so-called labyrinth gap in this way which gives high resistance to a flow and allows changes in length in the cell rotor 15 which are caused by temperature.

At least one inlet opening 77 and one outlet opening 78 are arranged in the charge air face housing 53 and the exhaust gas face housing 54 in the direction of the face walls 75, 76 limiting the housing part 55 and are assigned to each of the compressor registers 68, 69, 70. In the specific embodiment as is shown in particular in FIG. 5, three inlet openings 77 which are arranged evenly distributed in the circumferential direction are assigned to each of the compressor registers 68, 69, 70 and assigned to each of the outlet openings 78 by an angle of displacement. In this way a so-called multi-cycle pressure wave machine 13 is formed with which a supply with charge air adjusted to the respective requirement of the internal combustion engine 2 is achieved by selective activation and deactivation of individual cycles. As a result of this adjustability in the operating mode and in connection with the independent drive of the pressure wave machine 13 it is also possible to omit the pockets known from the state of the art, thus achieving space for the formation of the flow-in ducts 79 and flow-off ducts 80 for the charge air stream (pursuant to arrow 81) and the exhaust gas stream (pursuant to arrow 82).

As is shown further, the charge air face housing 53 is provided with switching members 83 such as flaps in the flow-off ducts 80 for the charge air stream (pursuant to arrow 81) which are arranged on the high-pressure side and are assigned to each of the compressor registers 68, 69, 70, which flaps can also optionally be provided in the exhaust gas face housing 54 in the flow-in ducts 79 for the exhaust gas stream (pursuant to arrow 82) which are arranged on the high-pressure side. This brings about a selective activation and deactivation of individual compressor registers 68, 69, 70 which are operated in connection with flap actuation apparatuses 84 such as electromagnets 85 depending on predetermined parameters of the internal combustion engine 2 and by way of the aforementioned control device 19. In this respect the switching members 83 which are arranged in the high-pressure zone of the charge air stream (arrow 81) and of the exhaust gas stream (arrow 82) are operated synchronously.

Optionally, the flow-off ducts 80 which are arranged on the low-pressure side for the exhaust gas stream (pursuant to arrow 86) are provided with a locking device 88 which is formed in particular by flap traps 87. This locking device 88 can be assigned to only individual ones of the compressor registers 68, 69, 70 for example.

In order to prevent flow losses the flow-in ducts 79 and the flow-off ducts 80 for the supply of the compressor registers 68, 69, 70 are arranged with favourable flow properties and extend spirally in the charge air face housing 53 and exhaust gas face housing 54 separated by separating walls 89.

Optionally, sealing arrangements 92 are arranged in the face wall s 75, 76, which arrangements are on the surfaces 90, 91 facing the cell rotor 15 and extend concentrically to the longitudinal central axis 56. They co-operate with the leading edges 93 of the register walls 64, 65 of the inner tube 66 and of the jacket tube 67 and separate the compressor registers 68, 69, 70 from one another in respect of flow. As a result of these sealing arrangements 92 it is possible in connection with the switching members 83 to operate each of the compressor registers 68, 69, 70 individually or jointly.

Such a sealing arrangement 92 can also be omitted in the case of careful arrangement of the components and their mutual adjustment, i.e. by providing the smallest possible distances between the fixed components and the rotating cell rotor 15.

In a preferred embodiment the annular-shaped share of surface limited by the inner tube 66 and the jacket tube 67 is divided at a ratio of 40%:40%:20% by the register walls 64, 65. In this respect it is possible for example that the charging of the compressor register 68 which encompasses the inner tube 66 immediately occurs depending on the temperature difference between the cell rotor 15 and the housing 52 in order to avoid expansions caused by temperature and thus to achieve a compensation in the axial play.

As is shown in the representation of the switching members 83 (shown in the broken lines), they are formed by individually remotely actuatable flaps for example. Depending on the position of these flaps, the compressor registers 68, 69 can be activated and deactivated individually or jointly in this specific embodiment. It is understood that such switching members 83 can be provided for all compressor registers 68, 69, 70 which are provided in the pressure wave machine 13. Their arrangement can occur both on the high-pressure and/or low-pressure side in the charge air face housing 53 and/or exhaust gas face housing 54 or separate switch housings.

The arrangement of the switching members 83 and their flap actuating apparatuses 84 can be made in such a way that any desired intermediate position is adjustable between an opened and closed position and that thus the switching members 83 can be used for the achievement of throttle control elements. In this way it is possible to realize an internal exhaust gas return in the form of a flow short circuit.

As is shown further in FIG. 5, the cell rotor is arranged torsionally rigidly on the engine shaft 58 via the hub 59. Cell rotor 15 is provided with the inner tube 66 and the jacket tube 67 and, between the same, the register walls 64, 65 which subdivide the cell rotor 15 in the radial direction into the compressor registers 68, 69, 70. The compressor register 68 is arranged with three paths of flow for example, with the paths of flow being separated by parallel-flow walls 71 which extend concentrically to the longitudinal axis 56. The bridge-like cell walls 74 extend in the radial direction which subdivide the cell rotors 15 into cells and bring about the mechanical connection between the inner tube 66 and the jacket tube 67, and the register walls 64, 65 and the parallel-flow walls 71. A possible arrangement of the cell rotor 15 consists of a sheet-welding construction. Conversely, a diecast arrangement is also possible. As is known it is further possible to coat surfaces of the components of the cell rotor 15 with catalytic material in order to achieve a reduction of pollutant emission during the operation of the pressure wave machine 13. The further compressor registers 69, 70 can be arranged in one single path of flow or several paths of flow, as is shown.

In the face wall 75 of the charge air face housing 53 which faces the cell rotor 15, inlet openings 77 for the compressor registers 68, 69, 70 are arranged in the radial direction mutually distanced from one another. In order to bring about a three-cycle pressure wave machine 13, a total of three groups of inlet openings 77 are arranged mutually offset by an angle 94 of 120° on the circular area formed by the face wall 75. The outlet openings 78 are arranged about an angle of displacement 95. A cross-sectional area of the inlet openings 77 on the low pressure side is larger than a cross-sectional area of the outlet openings 78 on the high-pressure side. The inlet openings 77 and the outlet openings 78 thus form inlet and outlet edges which extend in the radial direction and, as is known, cooperate mutually in the pressure wave process.

Figure 6:
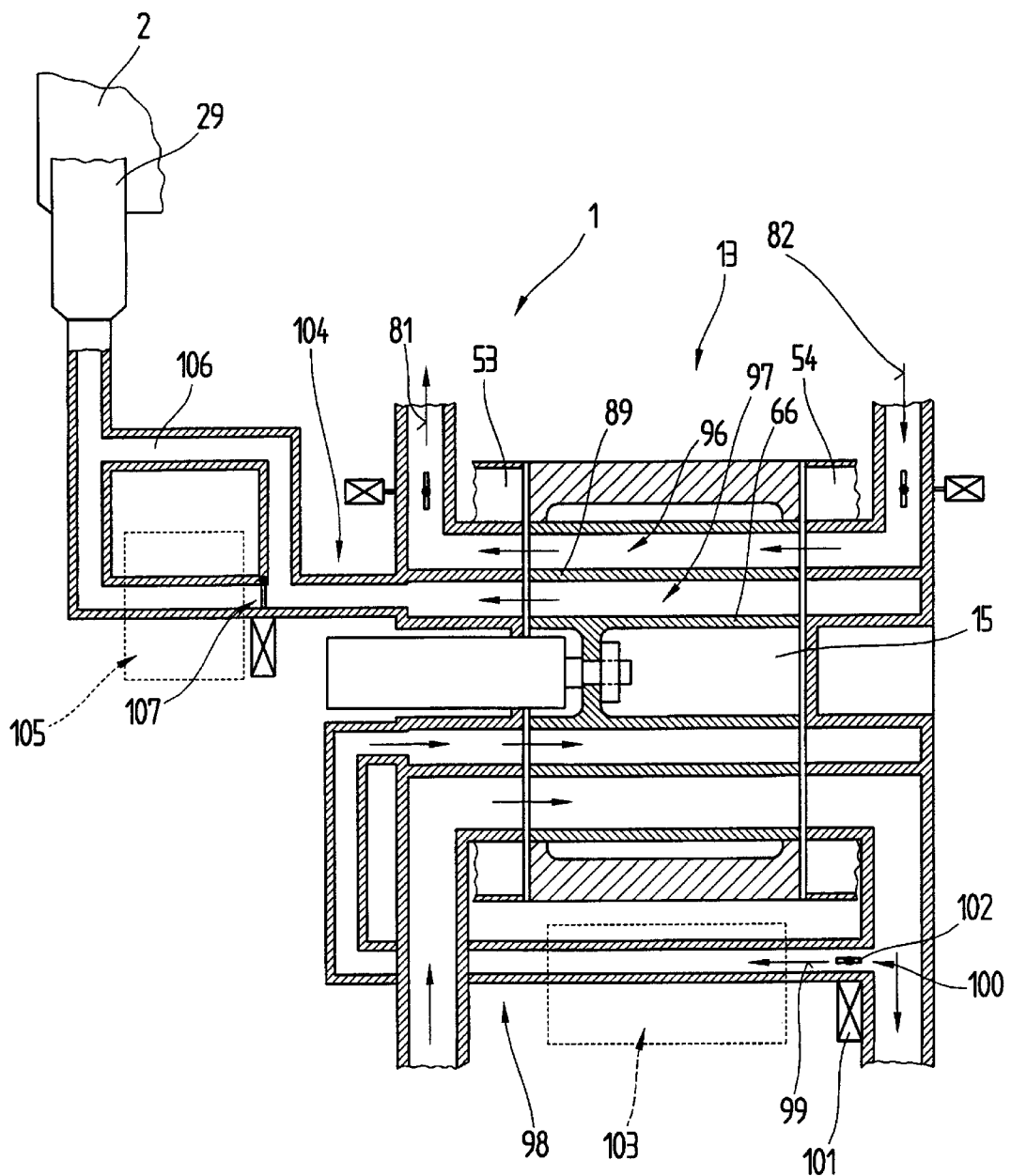
FIG. 6 shows another embodiment of the supercharging arrangement in accordance with the invention for an internal combustion engine in a simplified schematic and sectional representation.

FIG. 6 shows a further embodiment of the supercharging arrangement 1 with the pressure wave machine 13 in a schematic view. In this embodiment the cell rotor 15 comprises two compressor registers 96, 97 which encompass the inner tube 66 concentrically and are mutually separated by the separating wall 89. In this embodiment a connecting line 98 for a partial stream of the exhaust gas (arrow 99) is arranged between the exhaust gas face housing 54 and the charge air face housing 53. A Venturi butterfly valve 102 which is remotely controllable by a drive 101 is arranged in the zone of the flow-in opening 100 of the connecting line 98. As is indicated further by broken lines, it is possible to provide an intermediate cooler 103 in the course of the connecting line 98 which allows bringing about a specific temperature level for the partial stream of the exhaust gas. It can thus be supplied as needed to one of the compressor registers 96, 97 of the cell rotor 15, be compressed and be forwarded via a feed line 104 to the air collector 29. As is shown further by broken lines, a charge air cooler 105 can be arranged in the course of the feed line 104 to the air collector 29 in order to lower the temperature level of the partial stream of the exhaust gas which is compressed in the cell rotor 15 so that a rise in temperature of the charge air is prevented. As is shown further, a bypass line 106 for circumventing the charge air cooler 105 is provided. In this respect a Venturi butterfly valve 107 which is also remotely controllable is provided in order to selectively perform the operation via the charge air cooler 105 or the bypass line 106.

In the air collector 29 there will be a merging of the partial stream of the exhaust gas (pursuant to arrow 99) and the charge air stream (pursuant to arrow 81) and further a supply of this gas mixture to the internal combustion engine 2. This mixture of the partial stream of the exhaust gas (pursuant to arrow 99) with the charge air stream (pursuant to arrow 81) leads, as is already known, to a reduction in wear and tear in the internal combustion engine 2. Pollutant emission is also minimized.

It is understood that any other embodiment is possible in which, contrary to the embodiment as shown in a simplified way, the compressor register 97 for the partial stream of the exhaust gas (pursuant to arrow 99) can selectively be charged by way of a control device with fresh air or also with a mixture of fresh air and exhaust gas or with a gas stream of the crankcase ventilation. In such a case the thus conveyed partial quantity is to be supplied to the internal combustion engine 2 by avoiding the air cooler 28 in order to avoid soiling in the air cooler 28.

It is further also possible to use one of the compressor registers 96, 97 or one of the compressor registers 68, 69, 70 as described in the preceding embodiments for the relaxation of pre-cooled charge air and to supply this cool air to an integrated air-conditioning system for example and to use the same for the cooling of a vehicle, in particular a vehicle's cabin, provided with the charge device 1 in accordance with the invention.

FIG. 7 shows a schematic representation of the supercharging arrangement 1 with the pressure wave machine 13. The views towards the opposed face ends of the pressure wave machine 13 and towards the face walls 75, 76 were shown next to one another. The shown embodiment concerns a two-cycle pressure wave machine 13 with the compressor registers 96, 97. The right representation shows the view on the face wall 75 of the charge air face housing 53 and the left representation shows the face wall 76 of the exhaust gas face housing 54. The drive apparatus 16 such as an electromotor 17 for the drive of the pressure wave machine 13 which occurs independent from the internal combustion engine 2 is arranged on the face wall 75.

Each cycle and each of the compressor registers 96, 97 can be activated and deactivated in single or group switching via the switching members 83 which are arranged both in the air-inlet zone as well as exhaust gas zone. The switching members 83 are optionally arranged upstream or downstream both of the inlet openings 77 as well as the outlet openings 78. These switching members 83, or their drives such as electromagnets 108 respectively, are connected with the control device 19 of the internal combustion engine 2 by way of control lines 109. Moreover, The drive apparatus 16 is connected with the control device 19 with the line 18. The switching processes of the switching members 83 are initiated by means of the evaluation and control unit 21 which is provided in the control device 19, with the information required for this purpose being determined by the measuring transducers 24 such as the thermal sensor 25 for the temperature of the exhaust gas and a rotational speed sensor 110 which determines the rotational speed of the internal combustion engine 2.

The inlet openings 77 and the outlet openings 78 in the represented pressure wave machine 13 are located diametrically opposite, i.e. offset at an angle of 180°. An angle of displacement formed by an arc length 114 is provided in the direction of rotation (pursuant to arrow 113) of the cell rotor 15 between an opening edge 111, corresponding in the pressure wave process, of the inlet opening 77 for the charge air (pursuant to arrow 81) and a closing edge 112 for the outlet opening 78.

As is shown further in FIG. 7, this further possible embodiment is provided with an arrangement, e.g. of the exhaust gas face housing 54, which is swivellable about the longitudinal central axis 56 of the pressure wave machine 13 by means of a drive apparatus 115 such as a pressure-charged actuating cylinder 116 or an electrically charged spindle drive. This drive apparatus 115 is connected with the control device 19 via a line 117 and causes a relative adjustment of the charge air face housing 53 and the exhaust gas face housing 54 on the basis of parameters of the internal combustion engine 2. This allows for a variable angular offset between the opening edges 111 of the inlet opening 77 for the charge air and the exhaust gas according to predetermined control criteria which are derived from the respective operational state of the internal combustion engine 2. In addition to the operation of the pressure wave machine 13 with an adjustment speed by the drive apparatus 16 which is independent of the internal combustion engine 2, such a possibility for adjustment leads to a precise adjustment in the supply of the internal combustion engine 2 with precompressed charge air.

FIG. 8 shows a further embodiment of the supercharging arrangement 1 for an internal combustion engine 2. In this embodiment three pressure wave machines 118, 119, 120 which are equipped with drive apparatuses 16 are provided for the supply of the internal combustion engine 2. The pressure wave machines 118, 199, 120 are designed for different sizes and form the compressor register whose mode of operation is adjusted according to the respective requirements of internal combustion engine 2. They can be operated selectively and can be designed for single-cycle machines as well as for multi-cycle machines. Moreover, there is the possibility to arrange the same with a single path of flow or with several paths of flow. Switching members 83 such as electromagnet 85 are assigned to the pressure wave machines 118, 119, 120 in the line systems for the fresh air or charge air and for the exhaust gas, which members are line-connected with the control device 19. As has already been described in the preceding figures, the control device 19 controls the operation of the pressure wave machines 118, 119, 120 based on parameters of the internal combustion engine 2 such as temperature of the exhaust gas, speed of internal combustion engine 2, fuel throughput, etc. The data required for this purpose are determined by way of the measurement transducer 24 such as the thermal sensor 25, speed sensor 110, etc. and are converted into control commands for the drive apparatuses 16 and the switching members 83 in the evaluation and control unit 21 which is arranged in an integrated manner in the control device 19.

Such an arrangement for the supercharging arrangement 1 allows for a very small, compact modular unit for the pressure wave machines 118, 119, 120 and allows in addition for a very fine adjustment of the supply of the internal combustion engine 2 with precompressed charge air.

Such an arrangement is thus particularly advantageous for internal combustion engines 2 which as a result of their mode of operation, e.g. in the mobile area, have large fluctuations concerning their operational speed and where there is to be the most instantaneous response in the supply with charge air.

Notice shall further be taken that for the purpose of better explaining the pressure wave machine 13 in accordance with the invention a partly unproportional scale was chosen in the representations for the individual elements.

Notice shall be taken further that the technical details and the described components can be altered at will within the scope of the expertise of a man skilled in the art. Finally, individual features of the combinations of features as shown and described in the individual embodiments can form the subject matter of independent inventive solutions.

What is claimed is:

1. A supercharging arrangement for the charge air of an internal combustion engine with a pressure wave machine which is connected with an air-inlet line for the charge air and an exhaust gas line for the combustion gases, with a housing comprising inflow and outflow ducts and consisting of a charge air face housing, an exhaust gas face housing and a housing part which mutually distances the same, and with switching members which are arranged in the inflow ducts of the exhaust gas face housing, and with at least one cell rotor which is rotatably held by way of a hub in a bearing arrangement in the housing and comprises several paths of flow which are arranged concentrically with respect to one another and form mutually separated compressor registers, and is connected to a rotary drive and to a control device to which at least one switching member is connected, wherein further switching members which are controllable by the control device are arranged in the outflow ducts of the charge air face housing.

2. A supercharging arrangement as claimed in claim 1, wherein the cell rotor is connected with the inflow and outflow ducts which are provided with correspondingly arranged opening and closing edges which are mutually offset in the rotational direction of the cell rotor by a length of arc of an angle of rotation at a predetermined speed of the cell rotor and a predeterminable exhaust gas temperature, which angle corresponds to a running time of the pressure or suction waves through the cells of the cell rotor at the predetermined exhaust gas temperature and the rotational speed of the internal combustion engine and that on increasing the rotational speed and/or the exhaust gas temperature of the internal combustion engine the rotational speed of the cell rotor is higher and on decreasing the rotational speed and/or the temperature of the internal combustion engine it is lower.

3. A supercharging arrangement as claimed in claim 1, wherein the cell rotor is connected with the inflow and outflow ducts which are provided with correspondingly arranged opening and closing edges which are mutually offset in the rotational direction of the cell rotor by a length of arc of an angle of rotation at a predetermined speed of the cell rotor and a predeterminable exhaust gas temperature, which angle corresponds to a running time of the pressure or suction waves through the cells of the cell rotor at the predetermined exhaust gas temperature and the rotational speed of the internal combustion engine and is increased on increasing the rotational speed and/or the exhaust gas temperature of the internal combustion engine and is decreased on decreasing the rotational speed and/or the temperature of the internal combustion engine.

4. A supercharging arrangement as claimed in claim 1, wherein three compressor registers which encompass the hub in a concentrical manner are provided and at least one path of flow is assigned to each compressor register.

5. A supercharging arrangement as claimed in claim 1, wherein each of the annular compressor registers is connected to at least two inlet openings in the charge air face housing and exhaust gas face housing, which inlet openings are arranged in rotational symmetrical manner.

6. A supercharging arrangement as claimed in claim 1, wherein a switching member is arranged in at least one inflow duct of the charge air face housing and outflow duct of the exhaust gas face housing.

7. A supercharging arrangement as claimed in claim 1, wherein the switching member operates as a flow throttle.

8. A supercharging arrangement as claimed in claim 1, wherein a connecting line is connected between the exhaust gas line or the exhaust gas face housing and the charge air face housing which forms a flow duct for a partial stream of the exhaust gas.

9. A supercharging arrangement as claimed in claim 8, wherein the connecting line for the partial flow of the exhaust gas is connected via an inflow opening and an outflow opening in the charge air face housing with a compressor register and a feed line for the partial flow of the exhaust gas to the internal combustion engine.

10. A supercharging arrangement as claimed in claim 8, wherein one of the connecting line and the feed line for the partial flow of the exhaust gas comprises a cooler of the group comprising an intermediate cooler and a charge air cooler.

11. A supercharging arrangement as claimed in claim 1, wherein the drive apparatus of the cell rotor is formed by a servomotor which is operated independently of the rotational speed of the internal combustion engine.

12. A supercharging arrangement as claimed in claim 11, wherein the servomotor is formed by an electromotor which is connected with a control device and the power source.

13. A supercharging arrangement as claimed in claim 12, wherein the electromotor is a motor in the wheelhub which is encompassed by the cell rotor.

14. A supercharging arrangement as claimed in claim 1, wherein walls of the cell rotor are coated with catalytic material.

15. A supercharging arrangement as claimed in claim 1, wherein the pressure wave machine is provided upstream with a heat exchanger of a heating device which is connected with the exhaust gas line of the internal combustion engine.

16. A supercharging arrangement as claimed in claim 1, wherein a charge air control apparatus with a return line for a partial flow of the charge air to the pressure wave machine is located between an air cooler and an air collector.

* * * * *